United States Patent [19]

Nafisi-Movaghar

[11] Patent Number: 4,948,609

[45] Date of Patent: Aug. 14, 1990

[54] FRUIT AND VEGETABLE DRIED FOOD PRODUCT

[75] Inventor: Karim Nafisi-Movaghar, Walnut Creek, Calif.

[73] Assignee: Nabisco Brands, Inc., E. Hanover, N.J.

[21] Appl. No.: 155,611

[22] Filed: Feb. 12, 1988

[51] Int. Cl.$^5$ .......................... A23P 1/14; A23B 4/033
[52] U.S. Cl. ..................................... 426/321; 426/262; 426/268; 426/327; 426/443; 426/445; 426/447; 426/639; 426/640
[58] Field of Search ............... 426/321, 327, 333, 335, 426/384, 262, 268, 269, 443, 445, 447, 455

[56] References Cited

U.S. PATENT DOCUMENTS

| | | | |
|---|---|---|---|
| 2,110,184 | 3/1938 | Webb | 99/204 |
| 2,473,184 | 6/1949 | Webb | 99/204 |
| 2,509,719 | 5/1950 | Birdseye | 426/640 |
| 3,365,309 | 1/1968 | Pader et al. | 426/639 |
| 3,692,546 | 9/1972 | Dolev et al. | 426/333 |
| 3,894,157 | 7/1975 | Gottlieb et al. | 426/268 |
| 3,987,208 | 10/1976 | Rahman et al. | 426/326 |
| 4,775,545 | 10/1988 | Augustine et al. | 426/639 |

OTHER PUBLICATIONS

Introduction to the Biochemistry of Foods; Brauerman et al., Elsevier Pub. Co., NY 1963, p. 311.
A Complete Course in Canning, Book I, A. Lopez, Canning Trade Inc., Baltimore, Md. 1981, pp. 474–475.
Freeze-Drying of Foods, C. J. King, CRC Press, Cleveland, Oh., 1971, p. 53.
Food Dehydration, Van Arsdel et al., AVI Publishing Co., Westport, Conn., p. 476.
Introduction to the Biochemistry of Foods, Brauerman et al., Elsevier Pub. Co., N.Y. 1963, p. 311.

*Primary Examiner*—Donald E. Czaja
*Assistant Examiner*—D. Workman

[57] ABSTRACT

Fruits and vegetables can be vacuum dried to produce a crispy but yet tender puffed food products having a color and appearance of the original fruit or vegetable prior to processing. Enzymatic browning and reducing sugar browning is counteracted by the treatment of the fruit or vegetable in an infusion solution that contains at least one reducing acid and a proton donor to counteract enzymatic browning and a disaccharide to counteract reducing sugar browning. In addition the infusion solution can contain chelating agents and antimicrobial agents. In addition the fruit or vegetable can undergo a freeze-thaw tenderizing process which will also enhance the puffing of the fruit or vegetable. The product is a puffed and crisp but yet has a smooth texture when being consumed.

33 Claims, No Drawings

FRUIT AND VEGETABLE DRIED FOOD PRODUCT

BACKGROUND OF THE INVENTION

This invention relates to dried fruit and vegetable products which also have a puffed consistency. This invention further relates to a process for making fruit and vegetable dried products which have a puffed consistency, are crispy but yet tender, and which further are not susceptible to browning or other discoloration during processing or thereafter.

Various techniques have been used over the years to produce dried fruits and vegetables. One such technique is air drying. In such techniques the fruits and vegetables are washed and then laid out exposed to air and sun to dry. After being dried to the ambient moisture level the dried fruits and vegetables can be contacted with antimicrobial and preservative agents and then packaged. In another technique the fruit or vegetable is dried by being exposed to heated currents of air. In such processes the fruits and vegetables would be washed and then placed in a chamber whereby a heated air at a set relative humidity is passed through the chamber at a given flow rate. Depending on the temperature and the humidity of the heated air the fruits and vegetables can be dried to a moisture level of as low as about 10 percent by weight of moisture. However such processes do not produce a puffed dried product. Rather, what is produced in most instances is a product that due to shrinkage is hard and chewy. In addition such products have a rough rather than a smooth texture when being consumed.

Such drying processes that are conducted at atmospheric pressure also have a limitation with regard to how much moisture they can remove from the fruits and vegetables. Generally, such processes can reduce the moisture level of fruits and vegetables down to about 10 percent by weight to about 45 percent by weight moisture. This limitation is due to many factors. One factor is that during the dehydrating process it is desired to keep the temperature of the fruits and vegetables below about 70° C. If the fruits and vegetables are maintained at above about 70° C. for any extended periods of time the sugars in the fruits and vegetables invert and change thereby changing the flavor of the fruits and vegetables undergoing drying.

It has been recognized in the art that in order to achieve very low moisture levels for dried fruits and vegetables that vacuum techniques would have to be used. In vacuum drying techniques the fruits and vegetables can first be air dried or dehydrated to a reduced level using a heated air stream. At this point the dried fruits and vegetables have a moisture level of about 10 percent by weight to about 45 percent by weight. The dehydrated fruit can then be vacuum fried or vacuum dried. Additionally while the fruits and vegetables are being exposed to the vacuum conditions heat can be applied to drive more moisture from the fruits and vegetables that are being dried. After being dried to the desired level the fruits and vegetables can then be packaged.

In vacuum frying the fruit or vegetable is placed in an edible oil and a vacuum drawn while the oil is heated. The hot oil serves as a medium to heat and remove the water in the fruits or vegetables. Vacuum frying techniques can reduce the water content of a fruit or vegetable to less than about 5 percent by weight. The end product is a hard, crispy piece of fruit or vegetable. However, this product will contain a residual amount of oil that can be up to about 30 percent by weight of the fruit or vegetable.

In order to further increase the drying speed of the vacuum processes the items to be dried can be cut into smaller pieces, or in the alternative macerated to a puree. This provides for increased drying speed since there is an increased surface area to volume. A dehydrated fruit or vegetable that has undergone at least part of the dehydrating treatment under vacuum conditions can also be produced in a puffed form. One method to induce puffing of the fruit or vegetable is to have a step of rapidly reducing the pressure on the fruit or vegetable to cause the contained water to rapidly vaporize and create a puffed product as it escapes from the fruit or vegetable. Since these fruits and vegetables are usually dried in an oil the pores of these puffed fruits and vegetables are impregnated with the oil.

In addition, regardless of the type of vacuum drying that is used, there remains the problem that there is a discoloration of the fruits and vegetables during this processing. This discoloration is usually a browning of the surface of the fruits and vegetables. It is believed that this browning is the result of two different natural processes that are occurring. One is enzymatic browning. For instance, polyphenoloxidase causes browning in apples and peaches. The other is non-enzymatic browning resulting from the usually high level of fructose and other monosaccharides in these fruits and vegetables. Browning also affects the nutritional and flavor properties of the dehydrated fruits and vegetables. In addition, it does result in a very unattractive color for the fruits and vegetables and would lead one to believe that the dehydrated fruits and vegetables are spoiled, or in the alternative that the dehydrated fruits and vegetables were made from spoiled fruits and vegetables. The net result is that the consumer would not want to purchase and consume this type of a product. Therefore, it is a primary objective of this invention to set forth a process for producing puffed dried fruits and vegetables which retain their natural color. It is a further object of the present invention to set forth a technique whereby sliced fruits and vegetables can be preserved from undergoing enzymatic browning or non-enzymatic browning prior to or after undergoing subsequent processing to form the puffed products and during storage.

The present discoveries are directed to a technique for making puffed fruits and vegetables that retain the color and taste of the original fruit or vegetable. The puffed fruit or vegetable is crispy, but yet tender and has a smooth texture when being consumed. In addition it does not contain any oil or equivalent substances since it is not produced by a vacuum frying technique. Rather it is produced through a vacuum drying step to produce the puffed consistency of the product. The vacuum drying can be preceded by an air drying. In addition the fruit or vegetable will undergo an infusion solution treatment to prevent discoloration. Further the product can be tenderized and the amount of puffing in the final fruit or vegetable product increased through a freeze-thaw step prior to the vacuum drying of the fruit or vegetable to tenderize. The net result is the ability to produce a crispy, puffed fruit or vegetable snack product that has the original fruit or vegetable color and which does not contain any oils within the pores of the fruit or vegetable.

Various U.S. patents disclose techniques for drying fruits and vegetables using vacuum drying and vacuum frying techniques. In U.S. Pat. No. 1,543,948 wafers or cakes of a fruit are introduced into a vacuum drying apparatus where the temperature is maintained at 70° C. and the drying continued at a reduced pressure until the desired moisture level is reached. Usually the drying requires from six to eight hours. After vacuum drying the dried wafers or cakes are packed in a paper carton to prevent the loss of crispness through the adsorption of moisture from the atmosphere. Figs, raisins, and prunes can be dried using this technique.

U.S. Pat. No. 2,023,536 discloses a process for the vacuum drying of fruit. In this process a dehydrated fruit which can be in the form of a cake is placed within a vacuum chamber and a vacuum drawn. In addition, heat is applied to the vacuum chamber in order to raise the temperature of the fruit up to about 72° C. After being dried, it can be further treated or can be packaged. The dried product is substantially crisp and dry.

U.S. Pat. No. 2,110,184 discloses a process for puffing a fruit as well as dehydrating a fruit. In the disclosed process after an initial drying period, and during a second drying period, the vacuum chamber is subjected to a momentary increase in pressure followed by a sudden reduction in pressure and restoration of the former drying conditions. The result is that the fruit being dried will be puffed as a result of the moisture that is vaporized during the rapid reduction of the pressure. The escaping vaporous moisture puffs the fruit. After the puffed fruit has reached the desired low moisture level the temperature is reduced and air is then introduced into the vacuum chamber. Both procedures are conducted in order not to collapse the fragile porous structure of the puffed fruit.

U.S. Pat. No. 2,283,302 discloses the method of vacuum frying foods whereby a fluid is used in the vacuum chamber in order to apply heat to the foods that are undergoing drying. The objective in this patent is to evenly apply heat to the foods being dehydrated. In this process the food being dehydrated is immersed in an edible fat, ethyl alcohol, glycerin or other medium. It is possible to puff the food being dried in this process by raising the temperature of the liquid medium and to thereby cause an increase in the rate of the evaporation of moisture from the food.

U.S. Pat. No. 2,587,939 is directed to a vacuum frying process similar to that of U.S. Pat. No. 2,283,302. However, in this process it is disclosed that in a final step the dehydrated food can be restored to atmospheric pressure in the presence of the liquid used as the medium to heat the food or in the presence of a liquid exchanged for that used during drying. The result is a food product wherein the puffed structure is impregnated with a liquid.

U.S. Pat. No. 2,712,698 is related to the vacuum frying processes of the foregoing two patents and is directed to a method of removing the retained liquid heating medium from the pores of the dried fruit. That is, even when there is an attempt to remove all of the liquid in which the food has been vacuum dried, there will remain residues of the heated liquid in the dried food product. This is preferably removed by using low vapor pressure hydrocarbons, ethers, and halocarbons to extract the remaining liquid heating medium. The objective is to produce a purer product.

The problem of fruit and vegetable discoloration has also been addressed. In U.S. Pat. No. 1,842,720 there is disclosed a technique of treating fruits and vegetables with a solution containing sulfurous acid and/or a salt that will yield sulfurous acid. The solution should also contain some hydrogen peroxide which will react with sodium acid sulfite to change it to sulfate.

In U.S. Pat. No. 3,305,366 there is disclosed a process for preserving the color of fresh fruits by contacting the fruits with a solution containing pyrophosphoric acid and an alkali sulfite or bisulfite. This method for preserving fruits is shown to be superior to treatment with solutions containing ascorbic acid or citric acid.

U.S. Pat. No. 3,754,938 discloses a technique for preserving apple slices using a solution consisting of ascorbic acid, calcium chloride and sodium bicarbonate. The sodium bicarbonate is added to maintain a pH of 7 to 9 during treatment. When this treating solution is used a sulfiting treatment does not have to be used.

U.S. Pat. No. 3,894,157 discloses a method for stabilizing the color of freeze-dried carrots using ascorbic acid or erythrobic acid. These acids are noted to be antioxidants. An aqueous solution containing one of these acids is sprayed onto the carrots. When ascorbic acid is the acid, the ascorbic acid is in a concentration of about 1 to 3 percent of the solution. The carrots are then freeze-dried.

U.S. Pat. No. 3,987,208 discloses a process for extending the storage life of cut lettuce. This consists of treating the lettuce leaves with an aqueous solution of sodium meta bisulfite, citric acid, ascorbic acid, and potassium sorbate. Any excess solution is drained from the lettuce. The lettuce is then placed in bags that have a low gaseous transmission rate. This treatment increases the shelf life of the lettuce.

U.S. Pat. No. 4,011,348 discloses the treatment of raw fruits and vegetables with an aqueous solution having a pH between about 4 and 7.5 and containing a selected ascorbate ion concentration. The ascorbate is sodium ascorbate and ascorbic acid. However, it is directed that ascorbic acid should not be used alone. It results in an excessively low pH.

U.S. Pat. No. 4,504,504 discloses a technique for preserving the texture of diced fresh foods through the use of gelled polyuronic acids. This is stated to be superior to the use of citric acid or calcium chloride in preserving dried fresh food products.

U.S. Pat. No. 4,650,686 discloses a method for reducing excessive browning in a baked good containing reducing sugars. This is accomplished by adding to the dough baking soda and fatty acid monoglyceride esters of polycarboxylic acids. The agents minimize reducing sugar browning during the baking process.

In addition to these patents an article titled "Controlling Storage and Processing Conditions Helps Produce Light Colored Chips From Sweet Potatoes" from Food Product Development, May 1977, discloses that color development in sweet potatoes being formed into sweet potato chips is also an ongoing problem. The recognized problem is that potatoes, such as the Irish sweet potato, will undergo a darkening discoloration while being processed into potato chips. The result would be a darkened potato chip after frying. The conclusions reached in this article are that an acceptably colored chip can be produced from potatoes stored for 48 hours at 23° C. and then dipped in a solution containing 100 ppm sulfur dioxide. The dipped potato chips are then fried. If a lighter colored fried potato chip is desired the strength of the sulfur dioxide solution should be increased. Although a dip in a sulfur dioxide containing solution is preferred a water dip also has an influence on chip color.

Sulfur dioxide is a known preservative for various fruits and vegetables. Sulfur dioxide will also prevent a product from discoloring. It is used as a fruit or vegetable pretreatment in many vacuum frying processes. However, it is an additive to which some people are allergic. As a result, the use of sulfur dioxide to preserve food products is decreasing.

With regard to tenderizing fruits and vegetables U.S. Pat. No. 3,535,126 discloses a method of increasing the permeability of cellular foodstuff materials. The method consists of subjecting the foodstuff to a pressure of greater than about 50 p.s.i.g. while freezing the foodstuff. The pressure is released after the foodstuff is frozen. The resulting product is more permeable and yet the cell walls are still intact.

U.S. Pat. No. 3,792,184 discloses a technique for removing precipitating substances from plant extracts by a freezing and thawing process. Plant extracts such as extracts from cocoa powder or cinnamon powder contain undesirable precipitating substances such as proteins. These can be removed by freezing the extract and then raising the temperature of the extract to thaw the extract. Any precipitates are then easily removed by filtering or centrifuging the extract. Apparently this freeze-thaw processing coagulates these precipitating substances.

U.S. Pat. No. 4,495,205 discloses a process for making a meat analog product. In the process pasteurized vegetable protein is heated in an aqueous medium to remove volatiles. The heating is followed by a freezing step wherein the structure of the texturized vegetable protein is disrupted and its water binding capacity decreased. The frozen texturized vegetable product is then thawed and combined with a binder. This is then formed into a loaf and frozen. Freezing aids in activating the binder. The frozen product is then thawed and cooked.

In addition to these patents which discuss the freezing and/or thawing of substances, the book "The Freezing Preservation of Foods" by Donald K. Tressler and Clifford F. Evers, The Avi Publishing Co. New York 1947 discusses on pages 256 to 259 the changes caused in foods by freezing. Included is a discussion of the effect on the cell walls of foods from a freezing and thawing cycle.

BRIEF SUMMARY OF THE INVENTION

Fruits and vegetables can be made into puffed food products through a process of vacuum drying at an elevated temperature. The fruit or vegetable can first be air dried and then vacuum dried. The vacuum is maintained on the vacuum dried fruit or vegetable until the temperatures has been reduced to a level where the puffed structure is stable. The puffed dried fruit or vegetable product is crispy and tender but yet has a smooth texture when consumed.

Prior to drying the fruits or vegetables can undergo the steps of tenderizing and/or discoloration inhibition. Tenderizing consists of freezing and thawing the fruit or vegetable. It is preferred to slowly freeze the fruit or vegetable so as to create larger ice crystals within the fruit or vegetable. Fast freezing produces smaller ice crystals which do not tenderize and puff as effectively. The larger ice crystals rupture more cell walls which aid to increase the porosity of the fruit or vegetable. This tenderizes the fruit or vegetable. The rate of drying will also be increased. The step of freezing and thawing can be conducted as a first step after the fruits and vegetables have been prepared by washing, peeling and coring and/or pitting as needed; after the steps of treatment with an infusion solution to prevent discoloration; or after the fruit or vegetable has been partially dried, for example, after the step of air drying.

The fruits and vegetables are inhibited from discoloring by browning during drying and other processing if the fruits and vegetables are contacted with an aqueous infusion solution formulated to counteract enzymatic browning and non-enzymatic browning. The fruit or vegetables may also be blanched either in hot water, steam or other food grade liquid in order to deactivate the enzymes prior to contact with the infusion solution. The fruits and vegetables will be contacted with the infusion solution after they have been cut into the desired sized pieces. Discoloration, such as browning, occurs after the inner flesh of the fruit or vegetable is exposed to the atmosphere. The infusion solution is an aqueous solution which will in most instances contain at least one reducing acid preferably selected from the group consisting of erythrobic acid, ascorbic acid and sulfurous acid, a proton, donor material which is preferably an acid, and can be a reducing acid, a disaccharide, a chelating agent, and an antimicrobial agent. The primary ingredients are the reducing acid, the proton donor material and the disaccharide. A chelating agent is present when the fruit or vegetable contains metal ions that must be removed or is in contact with metal surfaces during processing. Antimicrobial agents are a part of the composition to inhibit the growth of microorganisms upon removal from the infusion solution through the subsequent air and vacuum drying stages. The fruit or vegetable pieces are maintained in the infusion solution for a period of time of about 0.1 hours to about 10 hours. The temperature of the infusion solution is maintained at below about 80° C., and preferably between about 10° C. to 75° C. After infusion the fruit or vegetable pieces are dried at atmospheric pressure to reduce the moisture content to about 10 percent to 45 percent by weight. A temperature of about 30° C. to about 80° C., and preferably about 35° C. to 75° C., is utilized in this drying. After the fruit or vegetable pieces have been dried to the desired level they are vacuum dried to a moisture content level of less than about 10 weight percent, preferably less than about 5 weight percent, and most preferably less than about 3 weight percent. The end product is a puffed, crispy and very tender piece of fruit or vegetable. The product is hygroscopic so after removal from the vacuum chamber it is packaged in a moisture impermeable container.

The process of vacuum drying is monitored by determining the temperature difference between the oven or tray on which the fruit or vegetable material has been placed and the temperature of the fruit or vegetable that is undergoing drying. When the fruit or vegetable is within about 5° C., and preferably within about 3° C. of the temperature of the tray or oven a moisture content of less than about 5 weight percent, and usually less than about 3 weight percent has been reached. The fruit or vegetable product is then cooled to less than about 40° C., and preferably to less than about 30° C., and the vacuum is released. The fruit or vegetable at atmospheric pressure is then packaged.

DETAILED DESCRIPTION OF THE INVENTION

Dried fruits and vegetables are very nutritious foods. However, besides being nutritious they must be appetizing in appearance. The dried fruits and vegetables must substantially retain their color after having undergone the drying process. One problem that arises is that when most fruits and vegetables are cut, they almost immediately start to undergo enzymatic browning and/or non-enzymatic browning. For example, enzymatic browning is caused by polyphenoloxidase in apples and peaches and exposure to the air. Other enzymes affect other fruits and vegetables. Non-enzymatic browning is the result of Maillard reactions which are reactions between monosaccharides such as glucose and fructose with proteins or carmelization caused by heating. Browning is quite evident when apples, peaches, pears, and similar fruits are cut into pieces. When an apple is sliced the newly exposed surfaces rapidly develop a brownish color. After a short period of time the newly exposed surfaces of the apple are very distinctly brown.

The problem in producing dried fruits and vegetables, and particularly dried fruits and vegetables having a moisture content of less than about 10 percent by weight, and preferably less than about 5 percent by weight, and most preferably less than about 3 percent by weight, is that during the extended drying periods the fruit or vegetable in the cut form will be exposed to atmospheric conditions for periods of time when browning can occur. If no precautions are taken the result will be fruit and vegetable products that will not be appealing to the consumer. It has been found that enzymatic browning and non-enzymatic browning can be countered through the use of particular aqueous infusion solutions. The fruit or vegetable after being cut is placed into the infusion solution for a period of about 0.1 to 10 hours. Prior to treatment in the infusion solution the fruit or vegetable can be blanched in a hot water solution or other food grade liquid at about 70° C. to 100° C. or through contacting with steam prior to being treated with the infusion solution. Blanching is completed within about 2 to 4 minutes. The temperature of the infusion solution is maintained at less than about 80° C. and preferably between about 10° C. to 75° C. The infusion solution is an aqueous solution that contains substances to counteract both enzymatic browning and non-enzymatic browning.

All of the components of the infusion solution are necessary for most fruits and vegetables in order to effectively combat browning. Even if a fruit or vegetable does not have a high native metal ion content, it will pick up metal ions from the processing equipment. These metal ions should be removed. In addition, an antimicrobial agent should be added as a means to extend the processing time and shelf life of the dried fruit or vegetable. Consequently, in most all instances the infusion solution will contain all of the described components.

Non-enzymatic browning is counteracted as a result of the infusion solution containing disaccharides. Most preferably the infusion solution should contain a nonreducing disaccharide, and in particular sucrose. The function of the disaccharide, is to exchange with a portion of the fructose and other monosaccharides of the fruit or vegetable. The substantial removal of fructose and other monosaccharides removes one of the reactants needed for a Maillard reaction to occur. In the Maillard reaction a reducing monosaccharide reacts with a protein. It is preferred that the disaccharide that is exchanged for the monosaccharide be the non-reducing disaccharide, sucrose. However, reducing disaccharides such a maltose, cellobiose and lactose can be used since the rate of hydrolysis is such that any significant browning will not occur. The disaccharide is present in the infusion solution an amount ranging from about 0.5 percent by weight up to 60 percent by weight, and preferably about 5 percent by weight to about 50 percent by weight. The exact amount used will depend on the reducing sugar content of the fruit or vegetable. While pineapple will require a disaccharide content of about 25 to 45 percent by weight, onion will require a level of less than about 5 percent by weight and in most cases less than about 1 percent by weight.

Enzymatic browning is counteracted by incorporating into the infusion solution an edible reducing acid an edible proton donor material which is usually a non-reducing acid. The preferred reducing acids are erythrobic acid, ascorbic acid and sulfurous acid, or a salt or other compound that will yield sulfurous acid. For the purposes of this application these substances will be termed sulfurous acid. The preferred proton donor materials are citric acid, lactic acid, malic acid, acetic acid and phosphoric acid. When erythrobic acid is used as the reducing acid, can be added to function as the proton donor acid, ascorbic acid material. The reducing acid will be present in an amount of about 0.1 percent by weight to about 2.5 percent by weight, and preferably about 0.25 percent by weight to about 1.5 percent by weight of the infusion solution. The proton donor material will be present in an amount of about 0.25 percent by weight to about 3.0 percent by weight, and preferably about 0.5 weight percent to about 2.0 percent by weight of the infusion solution. The exact amounts to be used will depend on the fruit or vegetable that is being treated. While one fruit or vegetable is more susceptible to nonenzymatic browning, another may be more susceptible to enzymatic browning. This will have a direct impact on the exact composition of the infusion solution.

The infusion solution will usually also contain a food grade chelating agent. The chelating agent binds up the metal ions on the fruit and vegetable surfaces. These metal ions may be naturally present in the fruit or picked up by the fruit or vegetable through contact with metal surfaces during processing. Any food grade chelating agents can be used. Suitable chelating agents are citric acid, phosphoric acid and food grade salts of ethylenediaminetetraacetic acid (EDTA). The chelating agent when present, is added in an amount of about 0.1 percent by weight to about 0.5 percent by weight, and preferably 0.2 percent by weight to about 0.4 percent by weight of the infusion solution. The exact amount to be added will depend on the metal ion content of the fruit or vegetable undergoing treatment. If there is a negligible metal ion content, and metal processing equipment is not to be used, the chelating agent need not be used.

The pH value of the infusion solution will be from about 1.5 to about 4.0. The exact pH value will depend on the fruit or vegetable undergoing processing. The pH of the fruit or vegetable pieces after having undergone a treatment in the infusion solution will range from about 2.5 to about 4.5. Again, the exact pH will depend on the particular fruit or vegetable that is undergoing processing.

The infusion solution can also contain other additives. Such additives include antimicrobial agents. Antimicrobial agents will inhibit the growth of microorganisms in the infusion solution and during the drying sequence. Suitable antimicrobial agents are sodium benzoate, potassium sorbate and alkyl parabens. These are added to the infusion solution in a minor amount, usually in a content of about 0.01 percent by weight to about 0.5 percent by weight when they are used in the infusion solution.

Prior to or after treatment with the infusion solution to prevent discoloration the fruits or vegetables can undergo a tenderizing process. This can also be conducted after the fruit or vegetable has been partially dried. The tenderizing process consists of freezing and thawing the fruit or vegetable. The fruit or vegetable can either be fast or slow frozen, however, it is preferred that a technique be used that will create ice crystals suitable for a proper texture. For example, large ice crystals will rupture more of the cell walls of the fruit or vegetable thus creating a more tender product. Slow freezing will create large ice crystals as will a process of freezing, increasing the temperature but still keeping the fruit or vegetable frozen, and then decreasing the temperature of the fruit or vegetable. The cycling of the temperature has the effect of increasing ice crystal size. A temperature of from about $-3°$ C. to $-20°$ C. or lower is sufficient for freezing the fruit or vegetable. The fruit or vegetable should be subjected to this temperature for at least about 0.1 hour and for preferably at least about 0.5 to twenty hours. The fruit or vegetable can be subjected to one or more freeze-thaw sequences for the purpose of tenderizing.

The fruit or vegetable can also be fast frozen by blast freezing or cryogenic freezing. In blast freezing a cold air stream at below about $-20°$ C. is passed over and around the fruits or vegetables. This quick freezes the fruits or vegetables. In cryogenic freezing a cryogenic fluid such as liquid nitrogen is used to cool a chamber to a low temperature. This in turn cools the fruits or vegetables. However in the quick freezing techniques the ice crystals formed in the fruits and vegetables are smaller with fewer cell walls being ruptured.

As noted above the freeze-thaw tenderizing process can also be conducted after the fruit or vegetable has been at least partially dried. Consequently the fruit or vegetable can be partially dried and then subjected to the freeze-thaw sequence to tenderize the fruit or vegetable. By conducting the freeze-thaw sequence after the fruit or vegetable has been at least partially dried the amount of the cell wall disruption and thus the degree of tenderizing can be controlled.

After treatment in the infusion solution, and a freeze-thaw tenderizing sequence if this step is to be a part of the process, the fruit or vegetable is dried at atmospheric pressure to a water content of about 10 weight percent to about 60 weight percent and preferably about 15 weight percent to about 45 weight percent. This drying will usually be conducted in an air drying chamber using a stream of heated air at about 30° C. to about 80° C., and preferably about 35° C. to about 75° C. The fruit or vegetable is resting on trays. Drying in most instances will be completed within a period of about 1 to 10 hours, and usually about 2 to 6 hours.

During air drying the temperature of the tray and the internal temperature of the fruit or vegetable are both monitored. This air drying can be conducted in the vacuum chamber with the vacuum chamber maintained at atmospheric pressure. After the fruit or vegetable is placed within the chamber for air drying the chamber is heated to a temperature of about 35° C. to about 70° C. and maintained at atmospheric pressure. Initially there is a large temperature difference between the fruit or vegetable and the temperature of the tray or oven. The fruit or vegetable is maintained in the drying chamber at atmospheric pressure until the temperature difference has been reduced to less than about 10° C. and preferably to less than about 4° C. The fruit or vegetable is then placed under a vacuum. If the vacuum chamber is being used as the air drying chamber then the vacuum chamber need only be evacuated. The temperature of the vacuum chamber is maintained at about 50° C. to about 125° C. during vacuum drying. When the chamber is evacuated the result is that the internal temperature of the fruit or vegetable undergoing drying decreases rapidly. This is the result of heat of vaporization cooling. A vacuum of about 5 to 28 inches of mercury is maintained during the drying. When the temperature difference between the temperature of the oven or tray and the internal temperature of the fruit or vegetable narrows to less than about 5° C., and preferably less than about 3° C. the vacuum chamber is cooled to less than about 40° C. and preferably less than about 30° C. and the vacuum chamber then equilibrated to atmospheric pressure. The dried fruit or vegetable product is then removed from the vacuum chamber and packaged. The product as it comes from the vacuum chamber is in a puffed porous condition as well as being of a crispy consistency. However, although being crunchy, the product is very tender. The moisture content of this product is less than about 5 percent by weight and usually to less than about 3 percent by weight.

Although it would not be practiced very often, it is possible for the fruit or vegetable to forgo the infusion treatment step and to solely use the tenderizing step in order to produce the crisp but yet tender puffed product. This would not be done very often since almost all fruits and vegetables undergo some form of browning. However vegetables that can be so processed are onions and carrots. This is particularly the case if the onion has been fermented for up to 6 hours in order to remove some of the pungent characteristics. A step of infusion solution treatment would not be required for onion. However at least one freeze-thaw sequence is necessary in order to produce a puffed tender product.

The attractiveness of this product is that although it has a crispy texture it is quite tender due to the puffy porous structure of the dried fruit or vegetable. The fruit or vegetable product due to the infusion solution treatment step has substantially retained the color of the original fruit or vegetable and has also retained its taste.

Flavorants can be added to the fruit or vegetable at essentially any time during the processing. However, flavorants if they are to be added, would usually be added at a point prior to the start of the drying steps or during the drying step.

Essentially, any fruit or vegetable be treated in present process. These include, but are not limited to, apples, bananas, pineapples, peaches, pears, plums, grapes, apricots, nectarines, strawberries, carrots, squash, onions, potatoes, tomatoes, celery, and peppers. The type of processing that a particular fruit or vegetable will undergo can be tailored to that specific fruit or vegetable. For instance while carrots and onions should undergo freeze-thaw tenderizing processing this is not necessary for most fruits. As a further example it is not necessary that onions, which must undergo the tenderizing process, to undergo infusion solution processing. The reason is that onions are not susceptible to discoloration. However, most fruits and vegetables will undergo both tenderizing and infusion solution processing prior to vacuum drying. The tenderizing processing will result in a more tender product that has a smooth texture while being consumed while treatment with the infusion solution will preserve the color, and to a large degree the flavor of the fruit or vegetable.

The foregoing invention will be described with particular reference to the following examples.

EXAMPLE 1

This example illustrates the making of a dried puffed pineapple chips.

Fresh pineapples are washed, trimmed peeled, cored and sliced. The sliced pineapple is then immersed in an infusion solution having the following composition:
- sucrose - 30 percent by weight
- erythrobic acid - 0.24 percent by weight
- citric acid - 0.24 percent by weight
- water - 69.52 percent by weight The pineapple slices are immersed in this solution at room temperature for about 2 hours. The ratio of soaking solution to fruit by volume is 2 to 1.

After soaking the fruit slices are drained and placed in a single layer onto trays and are slowly frozen for 8 to 12 hours. The freezing temperature is $-7°$ C. to $-12°$ C. Subsequent to freezing whereby the pineapple slices are frozen throughout, the fruit slices are thawed and contacted with a current of air at 66° C. until the fruit reaches a moisture content of about 15 to 20 weight percent moisture. This will occur in about 2 to 3 hours. After air drying the pineapple slices are transferred to a vacuum dryer. The pineapple slices are maintained at 66° C. and a vacuum of 28 inches of mercury. The pineapple slices are dried until the moisture content is less than 2.5 percent by weight. This requires about 3 to 4 hours. The dried pineapple slices are then cooled to less than 40° C. and the sliced pineapple brought to atmospheric pressure. The resulting product is a crispy, puffed pineapple which has retained the original pineapple color and taste.

EXAMPLE 2

This example illustrates the making of a dried puffed peach chips.

Fresh peaches are washed, pitted and sliced to a thickness of about 0.3 centimeters. The sliced peaches are then immersed in an infusion solution having the following composition:
- sucrose - 38 percent by weight
- erythrobic acid - 0.4 percent by weight
- citric acid - 0.4 percent by weight
- water - 61.2 percent by weight The peach slices are immersed in the infusion solution for 15 minutes at 54° C. The ratio by volume of the infusion solution to sliced peaches is 2 to 1.

After soaking in the immersion solution the peaches are drained and placed on trays in a single layer and slowly frozen at a temperature of $-7°$ C. to $-12°$ C. Freezing is completed in about 8 to 12 hours. Subsequent to freezing the sliced peaches are thawed and air dried to a moisture content of about 10 to 20 percent by weight. Air drying is conducted at a temperature of 66° C. After air drying the peach slices are placed in a vacuum drying chamber and a vacuum of 28 inches of mercury is drawn on the chamber. The oven is maintained at 66° C. during vacuum drying. Vacuum drying is complete upon the peach slices reaching a moisture content of less than 2.5 percent by weight. The dried peach slices are then cooled to less than 40° C. and peach slices brought to atmospheric pressure. The resulting product has a puffed structure but yet is crispy. The dried peach slices have maintained their color and taste.

EXAMPLE 3

This example illustrates the making of dried puffed carrot chips.

The carrots are washed, trimmed, peeled and sliced to a thickness of about 0.3 centimeters. The carrot pieces are then immersed in an infusion solution having the following composition:
- sucrose - 20 percent by weight
- erythrobic acid - 0.2 percent by weight
- citric acid - 0.2 percent by weight
- water - 79.6 percent by weight The carrot slices are immersed in this solution for 10 minutes at 88° C. The ratio of soaking solution by volume to the sliced fruit is 2:1.

After soaking in the immersion solution the carrot slices are drained and placed in single layers on trays. The carrot slices are then slowly frozen at $-7°$ C. to $-12°$ C. Freezing is completed in about 6 to 8 hours. The carrot slices are then thawed and placed in a vacuum dryer and dried at 74° C. and 28 inches of mercury. Vacuum drying is complete upon the carrots reaching a moisture level of less than about 2.5 percent by weight. Vacuum drying is completed in about 6 to 8 hours. The dried carrot slices are cooled to less than 40° C. and the sliced carrots brought to atmospheric pressure. The carrot pieces are crispy, but yet have a tender, puffed consistency.

EXAMPLE 4

This example illustrates the making of puffed onion chips.

The onions are peeled of their outer protective skins and cut into pieces of approximately 2 inches by 1 inch. The onion pieces are then fermented for up to 6 hours at 32° C. After fermentation the onion pieces are air dried at 49° C. to a moisture level of 40 to 60 percent. This is accomplished in about 2 hours. The air dried onion pieces are then frozen at a temperature of less than $-7°$ C. until the onion pieces have been completely frozen. The onion pieces are then thawed at atmospheric pressure and placed in a vacuum chamber for vacuum drying. The initial temperature of the vacuum dryer is 115° C. This is the tray temperature. The onion temperature is 82° C. The onion pieces are held at this temperature for about 35 minutes. A vacuum of 28 inches of mercury is drawn on the chamber and drying is complete when the moisture content of the onion pieces is less than 2.5 percent by weight. The onion pieces now n the form of chips are then cooled under vacuum to about 21° C. and the vacuum in the chamber is released. The dried onion chips are packaged as is or they are flavored, such as with sour cream, cheese or some other flavorant. The onion chips are crisp but yet have a puffed, tender consistency.

What is claimed is:

1. A process for producing dried fruit and vegetable products which are not susceptible to browning and which retain their natural color and have a puffed consistency comprising reducing the fruit or vegetable to pieces of a desired size; contacting said fruit or vegetable pieces with an aqueous infusion solution containing (a) a reducing acid selected from the group consisting of erythorbic acid, ascorbic acid and sulfurous acid; (b) a proton donor substance which is an acid, (c) a disaccharide, and (d) a chelating agent for a period of time to infuse said solution into said fruits or vegetables and to remove at least some of the monosaccharide content therefrom and then drying said fruits or vegetables at a reduced pressure and an elevated temperature to a water content of less than about 10 percent by weight and to allow the other components of the infusion solution to remain within the dried fruits or vegetables, decreasing the temperature of said pieces to less than 40° C. and then releasing the pressure to produce a fruit or vegetable piece which retains its natural color and has a tender puffed consistency.

2. A process for producing dried fruit and vegetable products as in claim 1 wherein said fruits or vegetables are dried at an elevated temperature to a moisture content of less than about 10 percent by weight by placing said fruits or vegetables on a tray in a heated oven at a reduced pressure, reducing the heat to below about 40° C. when the fruit or vegetable temperature and the tray temperature is within 10° C. and then releasing the vacuum.

3. A process for producing dried fruit and vegetable products as in claim i wherein prior to drying at a reduced pressure said fruits or vegetables are air dried to a water content of less than about 40 percent by weight.

4. A process for producing dried fruit and vegetable products as in claim 1 wherein prior to drying at a reduced pressure said fruits and vegetables are subjected to at least one sequence of freezing and thawing to tenderize said fruits and vegetables.

5. A process for producing dried fruit and vegetable products as in claim 4 wherein said fruits and vegetables are subjected to at least one sequence of freezing and thawing prior to contact with said aqueous solution.

6. A process for producing dried fruit and vegetable products as in claim 4 wherein said fruits and vegetables are subjected to at least one sequence of freezing and thawing after contact with said aqueous solution.

7. A process for producing fruit or vegetable products as in claim 1 wherein said disaccharide is a non-reducing disaccharide.

8. A process for producing dried fruit and vegetable as in claim 1 wherein said reducing acid is present in of about 0.1 percent by weight to about 2.5 percent by weight of said aqueous solution and said disaccharide is present in an amount of about 1.0 percent by wight to about 60 percent by weight of said aqueous solution.

9. A process for producing fruit and vegetable products as in claim 1 wherein said aqueous solution contains at least one antimicrobial agent.

10. A process for producing fruit and vegetable products as in claim 1 wherein said disaccharide is selected from the group consisting of sucrose, malose, lactose and cellobiose.

11. A process for producing fruit and vegetable products as in claim 10 wherein said disaccharide is sucrose.

12. A process for producing fruit and vegetable products as in claim 1 where said fruits and vegetables are selected from the group consisting of apples, bananas, pineapples, peaches, pears, plums, grapes, apricots, nectarines, carrots, squash, onions, potatoes, tomatoes, celery, and peppers.

13. A process for producing dried fruit and vegetable products which are not susceptible to browning and which have a puffed consistency comprising:
  (a) reducing the fruit or vegetable to pieces of a desired size;
  (b) placing said pieces of fruits or vegetables in an aqueous infusion solution containing (1) at least one reducing acid selected from the group consisting of erythrobic acid, ascorbic acid and sulfurous acid, (2) at least one donor substance which is an acid, and (3) at least one non-reducing disaccharide for a period of time to infuse said solution into said fruits or vegetables and to remove at least some of the monosaccharide content therefrom; and
  (c) drying said fruits or vegetables at atmospheric pressure for a first period of time and at a reduced pressure and an elevated temperature for a second period of time to a moisture content of less than about 10 percent by weight but with the components of the infusion solution remaining therein, reducing the temperature to less than about 40° C., and releasing the pressure.

14. A process for producing dried fruit and vegetable products as in claim 13 wherein prior to said fruits and vegetables being dried at a reduced pressure said fruits and vegetables are subjected to at least one sequence of freezing and thawing to tenderize said fruits and vegetables.

15. A process for producing dried fruit and vegetable products as in claim 14 wherein said fruits and vegetables are subjected to at least one sequence of freezing and thawing prior to contact with said aqueous solution.

16. A process for producing dried fruit and vegetable products as in claim 14 wherein said fruits and vegetables are subjected to at least one sequence of freezing and thawing after contact with said aqueous solution.

17. A process for producing dried fruit and vegetable products as in claim 13 wherein said fruits or vegetables are dried at a reduced pressure and at an elevated temperature to a water content of less than about 10 percent by weight whereupon the temperature is decreased and the fruits and vegetables exposed to atmospheric pressure.

18. A process for producing dried fruit and vegetable products as in claim 15 wherein said reducing acid is present in an amount of about 0.1 percent by weight to about 2.5 percent by weight of said aqueous solution and said disaccharide is present in an amount of about 1.0 percent by weight to about 60 percent by weight of said aqueous solution.

19. A process for producing dried fruit and vegetable products as in claim 13 wherein said aqueous solution contains at least one antimicrobial agent.

20. A process for producing dried fruit and vegetable products as in claim 13 wherein said disaccharide is selected from the group consisting of sucrose, maltose, lactose and cellobiose.

21. A process for producing dried fruit and vegetable products as in claim 13 wherein said fruits or vegetables are dried to a moisture content of about 10 to 45 percent by weight at atmospheric pressure and thereafter dried to a moisture content of less than about 10 percent by weight at a reduced pressure.

22. A process for producing dried fruit or vegetable products as in claim 13 wherein said fruits or vegetables are heated to about 35° C. to about 70° C. while being dried at atmospheric pressure.

23. A process for producing dried fruit or vegetable products as in claim 21 where said fruits or vegetables are dried to a final moisture content of less than about 5 percent by weight.

24. A process for producing dried fruit and vegetable products as in claim 20 wherein said disaccharide is sucrose.

25. A process for producing dried fruit and vegetable products as in claim 13 wherein said fruits and vegetables are selected from the group consisting of apples, bananas, pineapples, peaches, pears, plums, grapes, apricots, nectarines, carrots, squash, onions, potatoes, tomatoes, celery and peppers.

26. A process for producing dried fruit and vegetable products which are not susceptible to browning and which have a tender puffed consistency comprising contacting said fruit or vegetable products with an aqueous infusion solution containing (a) a reducing acid selected from the group consisting of erythrobic acid, ascorbic acid and sulfurous acid, (b) a proton donor acid, (c) a disaccharide, (d) a chelating agent, and (e) an antimicrobial agent for a period of time to infuse said solution into said fruits or vegetables and to remove at least some of the monosaccharide content therefrom, placing said fruits or vegetables on a tray, and then drying said fruits and vegetables at an elevated temperature and at a reduced pressure until the difference in the temperature of said fruit or vegetable and said tray is less than about 10° C., decreasing the temperature of said fruits or vegetables to less than 40° C., and releasing said reduced pressure.

27. A process for producing dried fruit and vegetable products as in claim 26 wherein prior to drying at a reduced pressure said fruits and vegetables are subjected to at least one sequence of freezing and thawing to tenderize said fruits and vegetables.

28. A process for producing dried fruit and vegetable products in claim 26 wherein prior to drying at a reduced pressure said fruits and vegetables are air dried to a water content of less than about 40 percent by weight.

29. A process for producing dried fruit and vegetable products as in claim 26 wherein said fruits and vegetables are dried to a water content of less than about 5 percent by weight.

30. A process for producing dried fruit and vegetable products as in claim 2 wherein said fruits or vegetables are heated at an elevated temperature and a reduced pressure until the difference between the fruit or vegetable temperature and the tray temperature is within 4° C.

31. A process for producing dried fruit and vegetable products as in claim 13 wherein said fruits or vegetables are heated at an elevated temperature on a tray until the difference between the fruit or vegetable temperature and the tray temperature is within 10° C.

32. A process for producing dried fruit and vegetable products as in claim 31 wherein said fruits or vegetables are heated at an elevated temperature and a reduced pressure until the difference between the fruit or vegetable temperature and tray temperature is within 4° C.

33. A process for producing dried fruit and vegetable products as in claim 31 wherein said fruits or vegetables are heated at an elevated temperature and a reduced pressure until the difference between the fruit and vegetable temperature and said tray temperature are within 4° C.

* * * * *